Jan. 10, 1928.
J. ROBINSON
1,656,020
AUTOMATIC TRAIN PIPE CONNECTER
Original Filed July 15, 1922
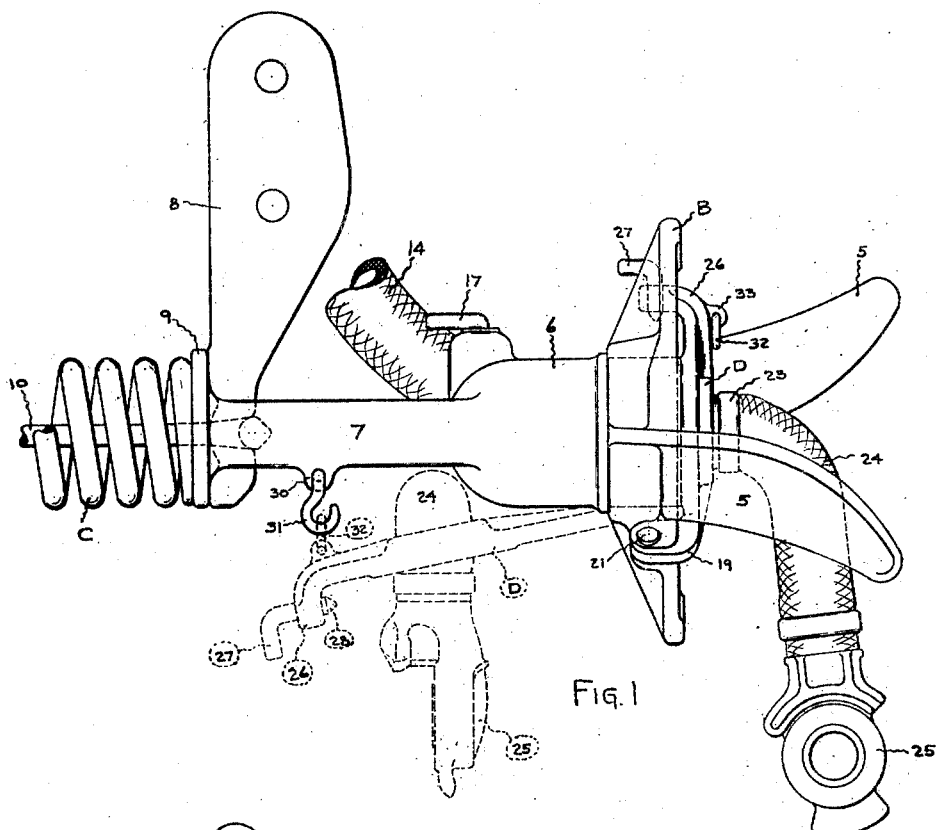
FIG. 1
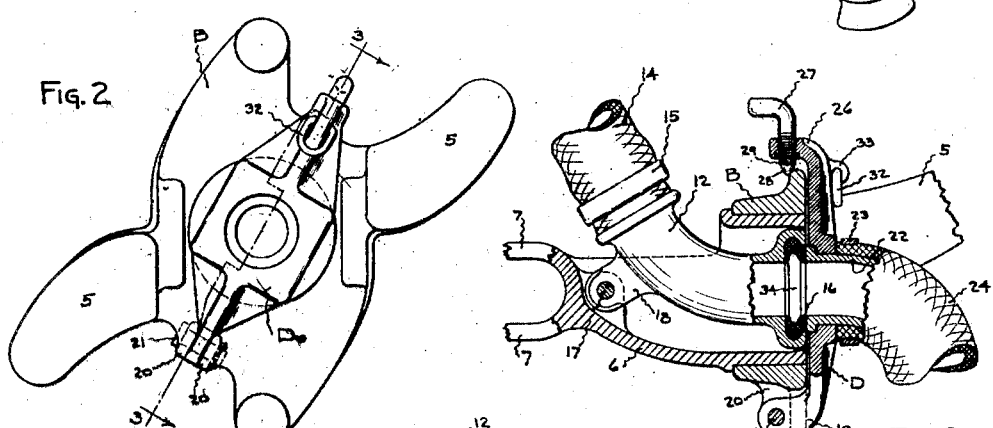
FIG. 2
FIG. 3
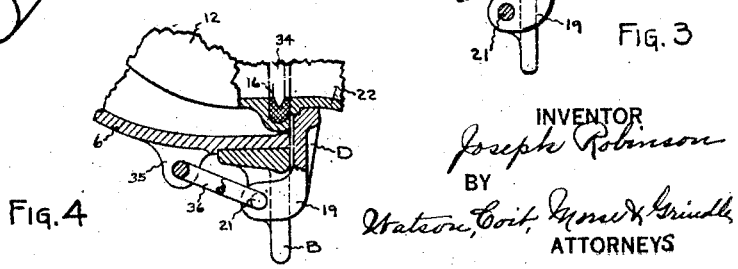
FIG. 4
INVENTOR
Joseph Robinson
BY
Watson, Coit, Lyne & Grindle
ATTORNEYS Patented Jan. 10, 1928.

1,656,020

UNITED STATES PATENT OFFICE.

JOSEPH ROBINSON, OF NEW YORK, N. Y.

AUTOMATIC TRAIN-PIPE CONNECTER.

Application filed July 15, 1922, Serial No. 575,135. Renewed July 2, 1927.

My invention relates to improvements in train pipe couplings, and more particularly to interchange devices for such couplings. One of its objects is to simplify previous constructions and improve their efficiency by reducing the friction which they impose to the free flow of the air, and by hanging the interchange on the coupling head in such wise as to make it adaptable for use on either the pin and funnel coupling head or on the wing type head. The patent to M. A. Barber #1,347,836 and dated July 27, 1920, shows a similar form of interchange, but it is not adaptable to the wing type of coupling head, the type shown in the accompanying drawings. The Barber device is hinged to the head at the top of the latter, and when not in use hangs downwardly across the rear face of the head. This is not objectionable with the pin and funnel head, but in the case of the wing type head it is in the way of the wings in coupling and causes mating heads to foul. I overcome this objection, and secure great compactness and ruggedness of design, by pivoting the interchange to the lower side of the head and extending it diagonally across the face of the head when in use. When not in use it is swung under the head and suspended from the under side of the shank out of the way of all coupling mechanism of both the pin and funnel and wing type heads, and where the minimum amount of ice and snow can gather upon it.

The invention is fully described in the following specification, pointed out in the appended claims and illustrated in the accompanying drawings in which—

Figure 1 is a side elevation of an automatic train pipe coupling provided with my improved interchange. In this view the rear portion of the spring C and the tie rod 10 are broken away.

Figure 2 is a front elevation of the construction shown in Figure 1, the bracket 8 and the interchange nipple 22, the hose section 24 and the coupling 25 being omitted.

Figure 3 is a sectional view through the interchange device and the coupling head taken on substantially the line 3—3 of Figure 2. In this view the shank 6 and the fitting 12 and hose 14 are shown in horizontal section as a matter of convenience, and Figure 4 is a view similar to Figure 3 illustrating a modification of my improvement.

Referring now to the drawings: Any suitable type of support, such as that illustrated in my copending application Serial Number 490,340 filed August 6th, 1921, and any desired form of coupling head, may be used. I show such a support at A, and a conventional form of butt face coupling head B having forwardly extending outwardly diverging guiding prongs or wings 5. The head has a centrally located opening into which the enlarged hollow forward end of a suitable shank 6 is pressed as shown particularly in Figure 3. The shank may, of course, be otherwise secured to the head if desired but I preferably press it therein as stated. Extending rearwardly from the enlarged portion of the shank are two spaced straps or walls 7 which embrace the lower end of a suitable bracket 8. These straps terminate in a vertically extending flange 9 through which a suitable tie rod 10 extends and embraces the lower end of the bracket 8 and has universal movement thereon. A suitable buffer spring C surrounds the tie rod 10 and presses the flange 9 against the rear face of the bracket to yieldingly sustain the coupling head A, all of which is fully described in my co-pending application Serial Number 490,340 aforementioned.

Extending into the hollow forward end of the shank 6 I provide a laterally extending hollow conduit 12 directly upon the rear end of which the usual train shank hose 14 is suitably secured as by means of a clamp 15, and at the forward end of which is carried an air extended gasket 16. A spring actuated pin 17 passes downwardly through the top wall of the shank 6 through a suitable lug 18 formed on the rear face of the fitting 12, and serves to lock the fitting in the pipe. This construction is fully described in my aforesaid co-pending application Serial #490,340.

Hinged at the lower side of the head I provide a plate or interchange D, the same being hinged to the head by means of a projection 19 on the plate D and passing between spaced lugs 20 formed on the head, a suitable pin 21 being passed through the lugs and the projection to pivotally secure the same to the head. Centrally located on the plate D I provide an opening in which is swively mounted a fitting or nipple 22 adapted to mate with the gasket 16. Upon this fitting I mount, as by a clamp 23, a short section of the ordinary train pipe hose 24, and in the lower end of this hose I suitably mount the usual hand operated hose coupling head 25. That end of the plate D which is opposite the end 19 thereof is provided with a rearwardly extending or overhanging portion 26 adapted to extend over a portion of the coupling head A as shown. Suitably threaded through this overhanging portion 26 I provide a locking screw 27 having a tapered inner end 28 adapted to contact with the rear side of the head and draw the interchange D and the nipple 22 tightly against the gasket 16. Accidental extraction of the locking screw is prevented by a pin 29 which passes through the lower end thereof and in front of the threads thereon. By disposing the interchange diagonally across the head as shown particularly in Figure 2, I am able to obtain extreme compactness of construction with the resulting reduced cost of manufacture and added ruggedness.

When not in use the interchange D is carried under and to the rear of the head and hence out of the way of the coupling mechanism of mating heads as shown in dotted lines of Figure 1. To support the interchange in this position I provide a suitable lug 30 formed integrally with one of the straps 7 of the shank 6, and I mount in it a suitable hook 31 adapted to receive a link or other form of support 32 swivelly connected to the interchange base D as at 33, Figure 2.

The operation of my improvement is as follows: When a car equipped with the automatic coupling meets one not so equipped, the interchange device D is disconnected from the hook 31 and swung into the position shown in full lines in the several views. The locking screw or clamp 27 is screwed inwardly into engagement with the coupling head B and as shown in Figure 3, thus tightly clamping the interchange device against the face of the head with the nipple 22 in alignment and in air tight engagement with the gasket 16. The hose of the unequipped car is then coupled into the hand operated coupling 25 of the interchange D in the usual way, the short section of rubber hose 24 giving sufficient movement to the coupling 25 to readily permit of this operation. The rotatability of the nipple 22 in the plate D greatly facilitates this operation since it permits the hand operated coupling 25 to be rotated at will in the plate D thus minimizing the flexing of the hose section 24 and hence prolonging its life. This construction produces a simple and highly efficient interchange which does not complicate the connecter proper in any way and which, when the transition period is over, may be readily disconnected from the connecter, by extracting the pin 21, and discarded. It is inexpensive inasmuch as the hose 24, and the hand operated coupling 25, may be reclaimed from the scrap piles of the railways. A further advantageous feature of my improvement is that the fluid carried by the conduit 12 actuates the gasket 16 by entering the groove 34 formed therein and forcing the gasket face forward against the face of the nipple 22, thus producing an absolutely tight and dependable joint.

In Figure 4 I illustrate a modification of the foregoing construction which consists in pivotally mounting the interchange D on the shank 6 instead of on the lower side of the coupling head B. This I accomplish by providing the forward end of the shank with a radially extending perforated lug or ear 35 on which the interchange D is pivoted or hinged as by a suitable chain link 36 which connects the lower end 19 of the interchange D with the lug 35. In other respects the construction is the same, and operates as the preferred form above described.

What I claim is:

1. In an automatic train pipe coupling, the combination of a coupling head, a shank for supporting said head, an interchange device hinged to said head at a point rearwardly of the coupling face of the head, said interchange device being arranged to be swung into a position at the rear of the coupling face of the head or into a position extending across the face of the head and below said shank, means to clamp said interchange device against the face of the head, means to support said device when swung into position below said shank, and a hand operated hose coupling attached to said interchange device to connect thereto the hose of a car not equipped with an automatic coupling.

2. In an automatic train pipe connecter, the combination of a coupling head, a shank for supporting said head, an interchange device hinged at its lower end to one of said last named parts, said interchange device being arranged to be swung into a position beneath said shank or into a position extending across the face of said head, means to clamp said device against the face of the head, means to support the same beneath said shank, and a hand operated hose coupling attached to said interchange device to connect thereto the hose of a car not equipped with an automatic connecter.

3. In an automatic train pipe connecter, the combination of a coupling head having a guiding prong or wing on each side thereof, a shank for supporting said head, an interchange device hinged at its lower end to the lower part of said head, said interchange device being arranged to be swung into a position beneath said shank or into a position extending diagonally across the face of said head between said wings, means to clamp said device against the face of the head, means to support the same beneath said shank, and a hand operated hose coupling attached to said interchange device to connect thereto the hose of a car not equipped with an automatic connecter.

4. In an automatic train pipe connecter, the combination of a coupling head, a shank for supporting said head, an interchange device hinged at its lower end to one of said last named parts rearwardly of the coupling face of the head, said interchange device being arranged to be swung into a position beneath said shank or into a position extending across the face of said head, means to clamp said device against the face of the head, means to support the same beneath said shank, and a hand operated hose coupling attached to said interchange device to connect thereto the hose of a car not equipped with an automatic connecter.

In testimony whereof I hereunto affix my signature.

JOSEPH ROBINSON.